July 7, 1942.   C. S. ASH   2,289,166
DUAL WHEEL BRAKE
Filed June 29, 1938   3 Sheets-Sheet 1

C. S. Ash
INVENTOR
BY
Morgan Finnegan Durham
ATTORNEYS

July 7, 1942.                    C. S. ASH                    2,289,166
DUAL WHEEL BRAKE
Filed June 29, 1938                            3 Sheets-Sheet 2

INVENTOR
C. S. Ash
BY
Morgan Finnegan & Durham
ATTORNEYS

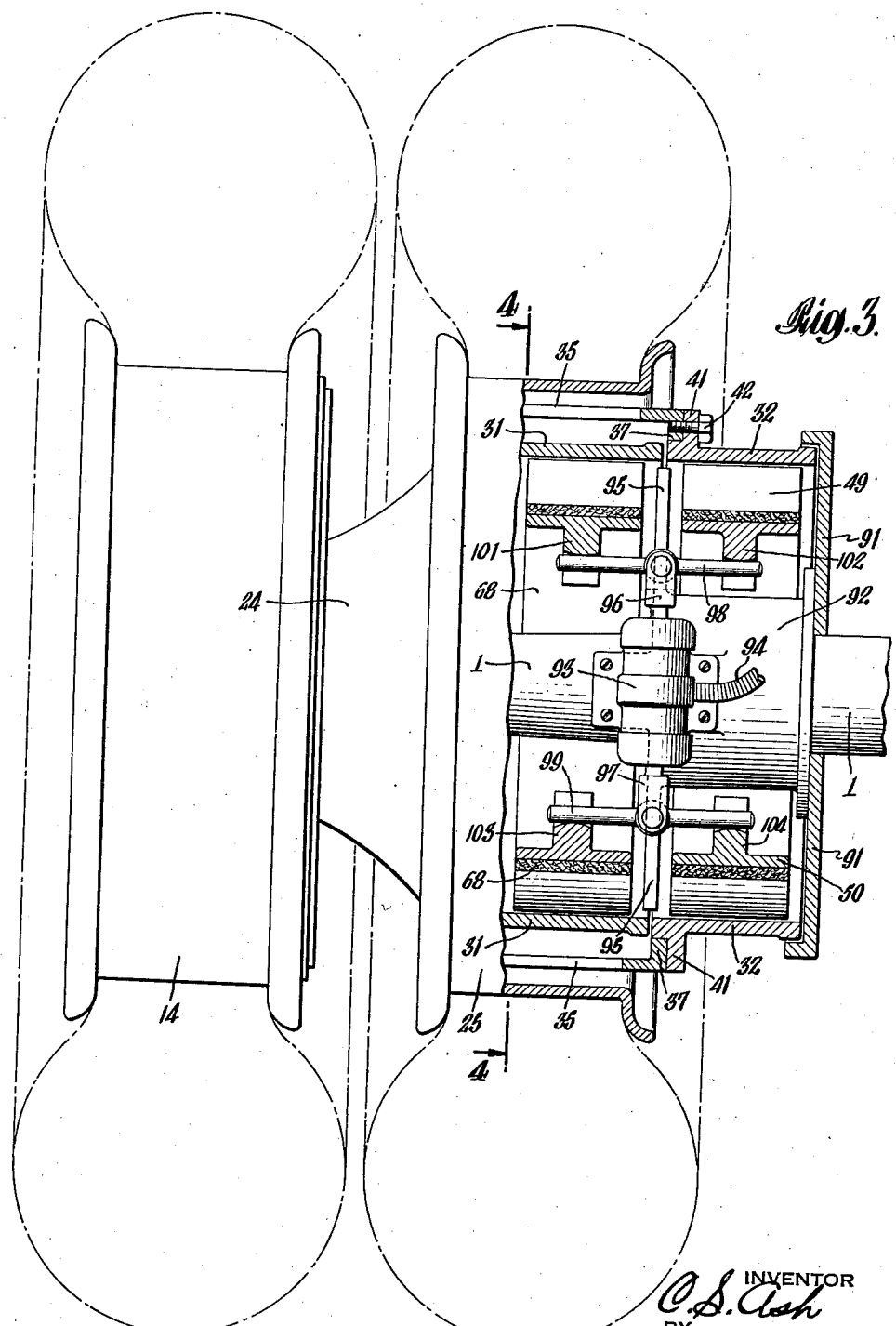

Patented July 7, 1942

2,289,166

UNITED STATES PATENT OFFICE 2,289,166

DUAL WHEEL BRAKE

Charles S. Ash, Milford, Mich.

Application June 29, 1938, Serial No. 216,572

41 Claims. (Cl. 188—18)

The invention relates to new and useful improvements in dual wheel vehicle supporting and progressive assemblies, and more particularly to such improvements in the wheel mounting and the braking mechanism for such dual wheel assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is a partial elevation and section of the same mechanism as Fig. 1 but showing hydraulic actuating means for the brake.

Figure 1:
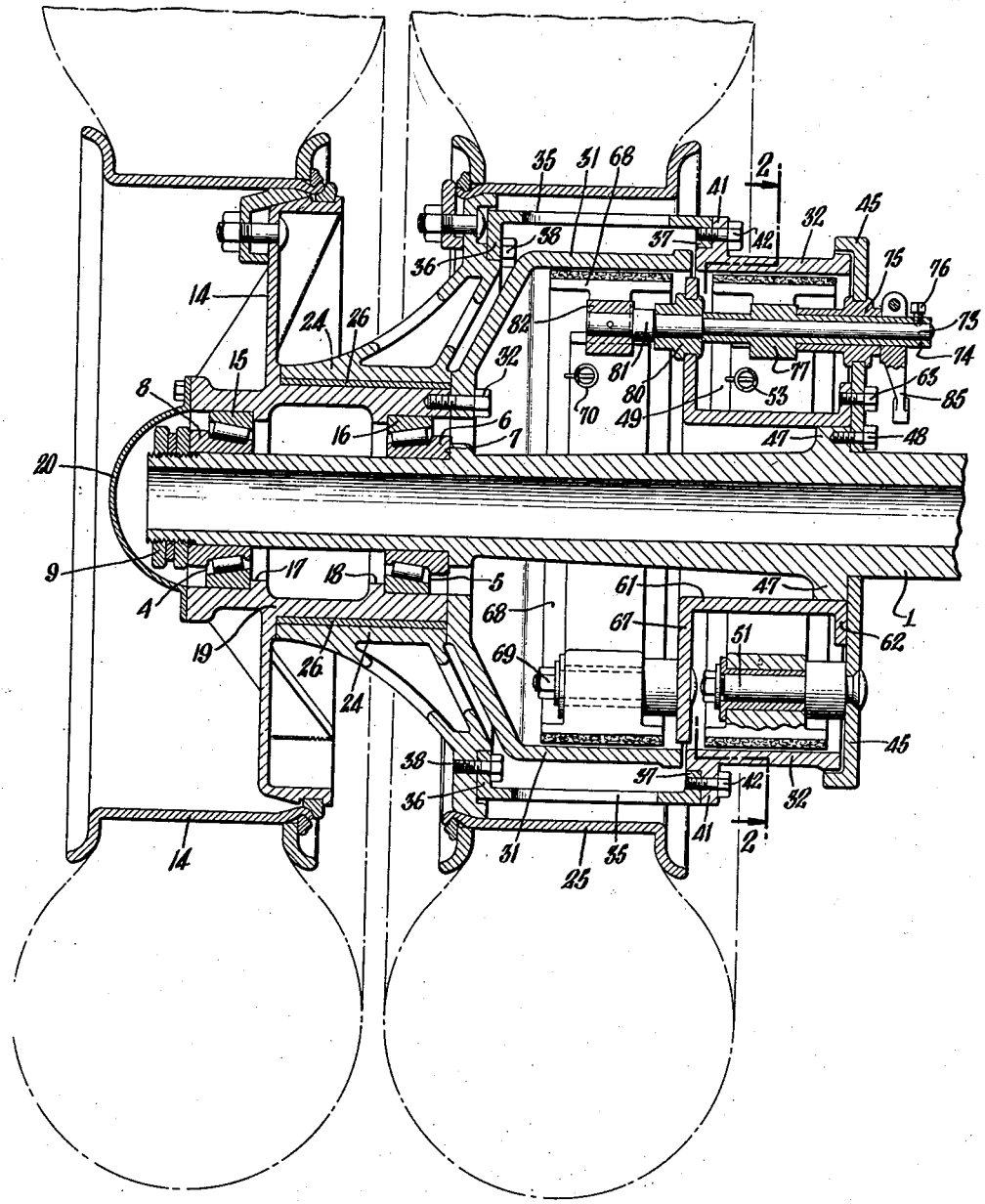
Fig. 1 is a central longitudinal section through a mechanism embodying the invention.

Objects of the invention are to provide a novel dual wheel assembly wherein two side-by-side wheels are mounted on the axle spindle by a relatively simple and strong construction, having well-spaced apart anti-friction bearings on the spindle; to provide independent braking means for the wheels; and to provide simple actuating means for concurrently operating the braking mechanisms; to provide a compact and sturdy construction of the entire wheel and braking assembly, with free running, broad bearings for both wheels, and independent and concurrently operating braking action on both independently rotating wheels; to provide assemblies embodying these and other advantages and characteristics, and at the same time utilizing standard, duplicate brake shoes, and actuating means therefor of standard or other simple construction.

With these and other objects in view, a preferred embodiment comprises an axle spindle with widely-spaced anti-friction bearings mounted thereon. An outboard wheel has a broad hub journaled on the widely-spaced bearings, and the inboard wheel has a broad hub which in turn is journaled on the broad hub of the outboard wheel. The inboard wheel is dished somewhat deeply inwardly, and within this dished part is a brake drum which is fixed to the inner end of the hub of the outboard wheel. Alongside and just within this brake drum is a second brake drum, which in turn is fixed to the inner annular face of the inboard wheel. The two drums are thus on the inside of the assembly, and are closely side by side, the inner drum connected to the inboard wheel and the outer drum connected to the outboard wheel. Each drum is equipped with a standard brake shoe with the usual regulating means. An anchor plate is carried on the spindle just inside the inner drum and supports the inner brake shoe in the usual manner, and fixed to and projecting from the anchor plate, through the drum, is a cylindrical member carrying a second anchor plate which faces the other brake drum, and this anchor plate supports the brake shoe of the drum for the outboard wheel. Means are preferably provided for concurrently applying both brakes to their respective drums. The foregoing general description and the following detail description as well are exemplary and explanatory but are not restrictive of the invention.

Referring now in detail to the embodiment of the invention illustrated by way of example in the accompanying drawings, an axle spindle 1 has mounted thereon a pair of combined radial and thrust bearings 4 and 5. The inner ring 6 of bearing 5 abuts on an annular shoulder 7 formed on the axle 1, and the inner ring 8 of the bearing 4 is held on the spindle 1 by a lock nut 9. An outboard vehicle wheel 14 is mounted on the outer rings 15 and 16 of the bearings 4 and 5, the rings abutting on annular shoulders 17 and 18 formed on the interior of the hollow hub 19 of wheel 14. A suitable hub cap 20 is bolted on to the exterior of the hub 19 to enclose the axle end. Rotatably mounted on the hub 19 of wheel 14 is the hub 24 of an inboard wheel 25, the embodied mounting comprising an interposed sleeve 26. The inboard wheel is somewhat deeply dished inwardly, and nested within the wheel is a brake drum 31, which is fixed to the inner face of the hub of outboard wheel 14 by suitable means such as tap bolts 33. Brake drum 31 is thus fixed to rotate with outboard wheel 14. Located just within brake drum 31 is a brake drum 32, which is fixed to rotate with the inboard wheel 25, and for this purpose a drum-like frame member 35 is provided, having at either end, respectively, flat annular flanges 36 and 37. The flange 36 is seated in an annular seat on the inner face of the inboard wheel 25 and is held in place by tap bolts 38. The outer end of brake drum 32 is provided with an annular seat 41, which fits over and within the ring 37 to hold the drum 32 firmly in position upon the supporting frame 35, and is fixed thereto by tap bolts 42. Hub 24 and spider 35 are preferably formed with a plurality of apertures, the apertures of hub 24 being nearer the center of rotation, and those of the spider 35 overlying one of the brake drums.

A circular anchor plate 45 is mounted on spindle 1 just within the drum 32, and abuts on an annular shoulder 47 formed on the spindle, and is fixed thereto by tap bolts 48. Brake shoes 49 and 50, which may be of standard type or construction, are positioned within the brake drum 32 and are mounted on anchor plate 45 by bolts 51 and 52 in the usual manner. A spring 53 acts resiliently between the shoes in the usual manner. The support for the brake shoes which cooperate with the brake drum 31 for the outboard wheel, comprises a cylinder 61 having a flat annular flange 62, the cylinder 61 fitting around the annular shoulder 47, the flange 62 fitting against the inner face of anchor plate 45, and being fixed thereto by bolts 63. The outer end of cylinder 61 is integral with a circular plate 67 constituting the anchor plate for the brake drum 31. Similar brake shoes 68, which may be of standard or other suitable form, are positioned within brake drum 31 and are supported from anchor plates 67 by bolt structures 69, and are acted on by a spring 70 in the manner already described.

Figure 2:
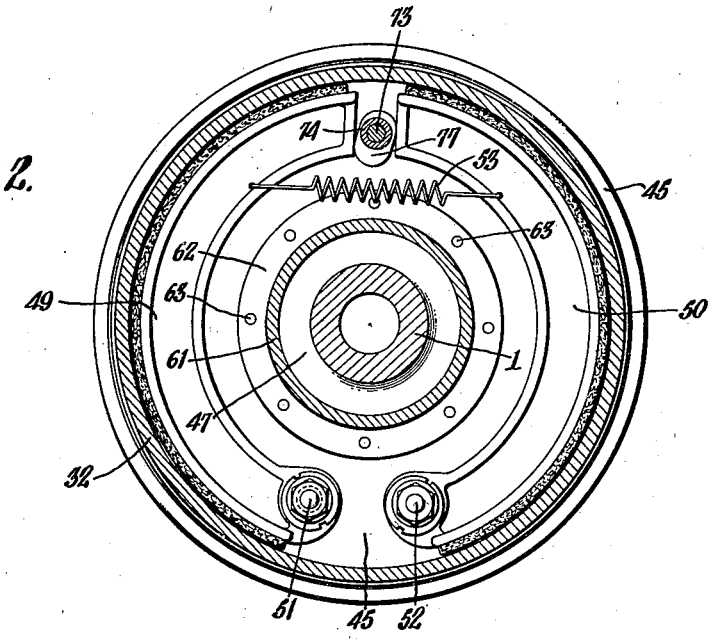
Fig. 2 is a section on the line 2—2 of Fig. 1.

In accordance with one feature of the invention, common actuating means for simultaneously applying and releasing the brake pressure on drums 31 and 32 are provided, and in Figs. 1 and 2 mechanically-operated means for doing this are shown. As there embodied, a shaft 73 has mounted thereon a sleeve 74, which sleeve is journaled in a bushing 75 mounted in the anchor plate 45. The bushing 74 is fixed to rotate shaft 73 by means of a clamping screw 76, and integral with sleeve 74 is a cam 77, which actuates the brake shoes 49 and 50. The shaft 73 is also journaled in a bushing 80 mounted in the anchor plate 67, and has a collar 81 abutting on the outer face of the bushing 80. An actuating cam 82 is fixed on the outer end of shaft 73, and this cam actuates the brake shoes 68 of the brake drum 31. An arm 35 is fixed to the sleeve 74 interiorly to the bushing 75, and is connected to the brake-controlling levers in the usual manner.

Figure 4:
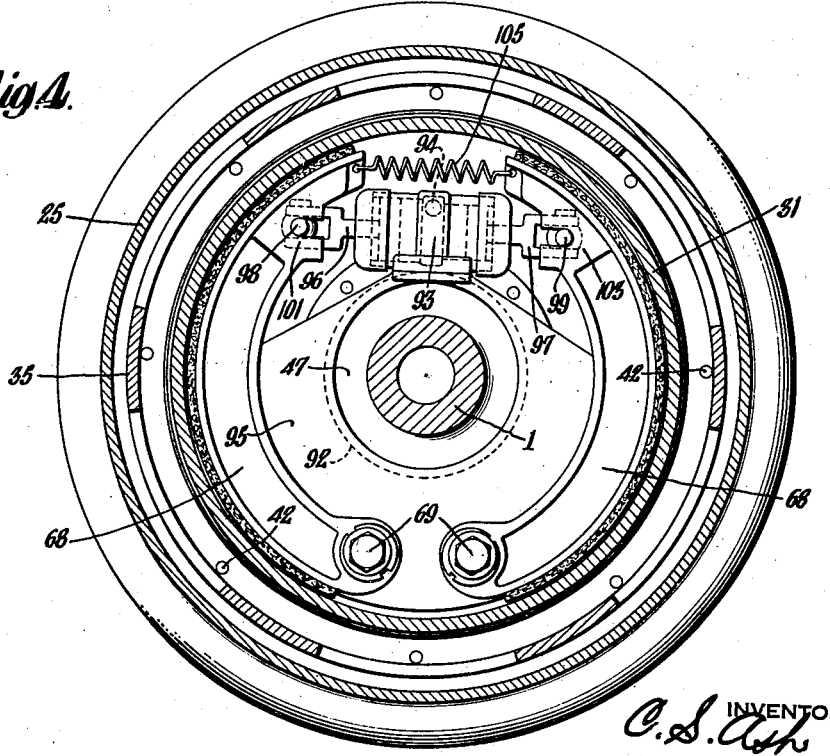
Fig. 4 is a section on line 4—4 of Fig. 3.

In Figs. 3 and 4 are illustrated an embodiment of a hydraulically operating mechanism for simultaneously actuating the two brake mechanisms. In said embodiment an anchor plate 91 is fixed on spindle 1 within the inner brake drum 32. Fixed to and extending from the outer side of anchor plate 91 is a supporting drum 92, on which is mounted a hydraulic double acting cylinder 93, having a supply pipe 94 connecting to the control mechanism. A separating plate 95 is mounted on the outer face of drum 92. The pistons of cylinder 93 are connected, respectively, to piston rods 96 and 97, and these rods in turn are yoked at their outer ends, and pivotally mounted in the yokes, respectively, are cross-rods 98 and 99. The rod 98, at either end is nested in recesses in lugs 101 and 102 formed, respectively, on the brake shoes within the two brake cylinders 31 and 32, and the cross-rod 99 in like manner at either end is nested in recesses in lugs 103 and 104, formed in the other brake shoes located within the two brake cylinders 31 and 32. A spring 105 acts to draw the brake shoes together in the usual manner. Thus by applying fluid pressure to the cylinder 93, the braking pressure is concurrently applied to both the brake drums 31 and 32, and on release of the pressure the braking pressure goes off in both brake drums.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly including in combination a spindle, two side by side wheels mounted on the spindle, and braking means including two brake drums mounted on the inner side of the inboard wheel, one of said brake drums being connected to the outboard wheel and the other brake drum being connected to the inboard wheel.

2. A dual wheel assembly including in combination a spindle, two side by side wheels mounted on the spindle, braking means including two brake drums mounted on the inner side of the inboard wheel, one of said brake drums being connected to the outboard wheel and the other brake drum being connected to the inboard wheel, and common means for applying braking pressure to said drums.

3. A dual wheel assembly including in combination a spindle, two side by side wheels mounted on the spindle, and braking means including two brake drums mounted side by side on the inner side of the inboard wheel, one of said brake drums being connected to the outboard wheel and the other brake drum being connected to the inboard wheel.

4. A dual wheel assembly including in combination a spindle, two side by side wheels mounted on the spindle, braking means including two brake drums mounted side by side on the inner side of the inboard wheel, one of said brake drums being connected to the outboard wheel and the other brake drum being connected to the inboard wheel, shoes for said brake drums and means for simultaneously actuating the brake shoes.

5. A dual wheel assembly including in combination a spindle, two side by side wheels, the outboard wheel having a hub mounted directly on said spindle, the inboard wheel being rotatably mounted on the hub of the outboard wheel, and braking means including a brake drum connected to the hub of the outboard wheel and located within the inboard wheel, a brake drum connected to the inboard wheel and located on the inner side of said first mentioned brake drum.

6. A dual wheel assembly including in combination a spindle, two side by side wheels, the outboard wheel having a hub mounted directly on said spindle, the inboard wheel being rotatably mounted on the hub of the outboard wheel, and braking means including a brake drum connected to the hub of the outboard wheel and located within the inboard wheel, a brake drum connected to the inboard wheel and located on the inner side of said first mentioned brake drum, shoes for said brake drums, and means for simultaneously actuating the brake shoes.

7. A dual wheel assembly including in combination a spindle, two side by side wheels mounted on the spindle, and braking means including two brake drums mounted on the inner side of the inboard wheel, one of said brake drums being connected to the outboard wheel and the other brake drum being connected to the inboard wheel, an anchor plate mounted on the spindle on the inner side of the inner brake drum, a brake shoe mounted on said anchor plate and cooperating with the inner brake drum, a second anchor plate on the inner side of the outer brake drum, and supported from said inner anchor plate, a brake shoe mounted on said second anchor plate and cooperating with the outer brake drum and means for actuating said brake shoes.

8. A dual wheel assembly including in combination a spindle, two side by side wheels mounted on the spindle, and braking means including two brake drums mounted on the inner side of the inboard wheel, one of said brake drums being connected to the outboard wheel and the other brake drum being connected to the inboard wheel, an anchor plate mounted on the spindle on the inner side of the inner brake drum, a brake shoe mounted on said anchor plate and cooperating with the inner brake drum, a second anchor plate on the inner side of the outer brake drum, and supported from said inner anchor plate, a brake shoe mounted on said second anchor plate and cooperating with the outer brake drum and means mounted in said anchor plates for simultaneously operating both brake shoes.

9. A dual wheel assembly including in combination a spindle, two side by side wheels, the outboard wheel having a hub mounted by a plurality of anti-friction bearings on the spindle, the inboard wheel having a hollow hub rotatably mounted on the exterior of the hub of the outboard wheel, and braking means including a drum connected to the hub of the outboard wheel and located within the inboard wheel, a brake drum connected to the inboard wheel and located on the inner side of said first-mentioned brake drum, and shoes for said brake drums, and an anchor plate structure mounted on the spindle within the inner drum and supporting both brake shoes.

10. A dual wheeled assembly including in combination an axle, a pair of wheels independently rotatable at the end thereof, a brake element for each wheel and mounted at the inner side of the two wheels, means interconnecting the brake elements with their respective wheels and anchored friction means for frictionally engaging the brake elements.

11. A dual wheeled assembly including in combination an axle, a pair of wheels independently rotatable at the end thereof, a brake element for each wheel, said brake elements being rigidly connected to their respective wheels and anchored friction means for frictionally engaging the brake elements to retard the rotation of the wheels, said friction means being located on the inner side of the wheels whereby the wheels may be removed without disturbing the friction means.

12. A dual wheeled assembly including in combination an axle, a wheel having an elongated hub rotatable on an end thereof, a second wheel rotatably mounted on the elongated hub whereby the wheels may rotate independently, a brake element fixed to the inner side of the elongated hub, a second brake element fixed to the second wheel, and anchored friction means engageable with the brake elements to retard rotation thereof.

13. A dual wheeled assembly including in combination an axle, a wheel having an elongated hub rotatable on an end thereof, a second wheel rotatably mounted on the elongated hub whereby the wheels may rotate independently, a brake element fixed to the inner side of the elongated hub, a second brake element fixed to the second wheel, and a pair of brake shoes mounted on the axle and engageable with their respective brake elements to independently retard rotation of the wheels.

14. A dual wheeled assembly including in combination an axle, a wheel having an elongated hub rotatable on an end thereof, a second wheel rotatably mounted on the elongated hub whereby the wheels may rotate independently, a brake element fixed to the inner side of the elongated hub, a second brake element fixed to the second wheel, said brake elements being closely adjacent and coaxial and a pair of brake shoes mounted on the axle and movable into engagement with their respective brake elements.

15. A dual wheeled assembly including in combination an axle, a wheel having an elongated hub rotatable on an end thereof, a second wheel rotatably mounted on the elongated hub whereby the wheels may rotate independently, a brake drum fixed to the inner side of the elongated hub, a second brake drum fixed to the inner side of the second wheel, said brake drums being in axial alinement, anchored brake shoes engageable with their respective drums and a common operating means for expanding the brake shoes to retard rotation of the wheels.

16. A dual wheeled assembly including in combination an axle, a wheel having an elongated hub rotatable on an end thereof, a second wheel rotatably mounted on the elongated hub whereby the wheels may rotate independently, a brake drum fixed to the inner side of the elongated hub, a second brake drum fixed to the inner side of the second wheel, said brake drums being in axial alinement, and anchored brake shoes engageable with their respective drums.

17. A dual wheeled assembly including in combination an axle, a wheel having an elongated hub rotatable on an end thereof, a second wheel rotatably mounted on the elongated hub whereby the wheels may rotate independently, a brake drum fixed to the inner side of the elongated hub, a second brake drum fixed to the inner side of the second wheel, said brake drums being in axial alinement, brake shoes anchored to the axle at the inner side of said wheels and engageable with their respective drums, and a common operating means for expanding the brake shoes to retard rotation of the wheels.

18. A dual wheeled assembly including in combination an axle, a wheel thereon having an inwardly extending hub, a second wheel rotatably mounted on the hub of the first wheel for rotation independently thereof, a brake element fixed to the inner side of the first wheel hub, a brake element fixed to the inner side of the second wheel, said brake elements being closely adjacent to each other, and anchored friction means engageable with the brake elements to retard rotation of the wheels, said wheels being removable from the axle without disturbing the friction means.

19. A dual wheeled assembly including in combination an axle, a wheel thereon having an inwardly extending hub, a second wheel rotatably mounted on the hub of the first wheel for rotation independently thereof, a brake element fixed to the inner side of the first wheel hub, a brake element fixed to the inner side of the second wheel, said braking elements being coaxial, and anchored friction means engageable with the brake elements to retard rotation of the wheels, said wheels being removable from the axle without disturbing the friction means.

20. In a dual wheel assembly having independently rotatable dual wheels, a pair of closely adjacent cylindrical brake drums positioned in axial alinement and connected to separate wheels, an inwardly extending member extending from one of the drums at one side of the pair of drums by which the drum is connected to one wheel, an anchor plate closely fitted over the end of the other drum at the other side of the pair whereby the entry of dirt into the brake drums is substantially excluded.

21. A dual wheel construction of the class described, comprising, in combination a pair of independently rotatable wheels, a brake drum associated with one of said wheels to rotate therewith, and a brake drum associated with the other of said wheels to rotate therewith, said drums being positioned so that one revolves within the other, the outer drum having a braked portion arranged adjacent to and of substantially the same diameter as the inner drum.

22. A dual wheel construction of the class described comprising, in combination, a wheel having an extended hub portion, a second wheel journaled upon said hub portion, a brake drum associated with said first wheel to rotate therewith and having a braked surface, and a brake drum associated with said second wheel to rotate therewith and surrounding the said braked surface of the first drum, said last drum having a braked surface arranged adjacent to and in substantially cylindrical alinement with the braked surface of the first drum.

23. In a dual wheel construction, in combination, a wheel having an extended hub portion, a second wheel having a transverse cylindrical passage therethrough of substantially the same length as the hub portion of the first wheel, the hub portion of the first wheel extending into said passage to journal the second wheel whereby to provide a broad supporting bearing for said second wheel, a pair of brake drums one of which is associated with the hub of the first wheel to rotate therewith and the other of which is associated with the second wheel to rotate therewith, said drums having adjacent brake engaging portions arranged in substantially a cylindrical plane.

24. A dual wheel assembly including in combination a spindle, two side by side wheels mounted on the spindle, braking means including two brake drums mounted on the inner side of the inboard wheel, one of said brake drums being connected to the outboard wheel and the other brake drum being connected to the inboard wheel, and common means engaging both brake drums for applying braking pressure to said drums.

25. A dual wheel assembly including in combination a spindle, two side by side wheels, the outboard wheel having a hub mounted by a plurality of anti-friction bearings on the spindle, the inboard wheel having a hollow hub rotatably mounted on the exterior of the hub of the outboard wheel, and braking means including a drum connected to the hub of the outboard wheel and located within the inboard wheel, a brake drum connected to the inboard wheel and located at the inboard side of said first mentioned brake drum, and shoes for said brake drums, and an anchor plate structure mounted on the spindle within the inner drum and supporting both brake shoes.

26. In a device of the class described, in combination, a wheel unit comprising a pair of independently rotatable wheels, a plurality of brake members one of which is associated with one of said wheels to rotate therewith and the other of which members is associated with the other of said wheels to rotate therewith, brake means held against rotation and comprising a plurality of brake elements each of which is engageable with one only of said members, and means for causing engagement of said elements with their respective members.

27. In a device of the class described, in combination, a wheel unit comprising a pair of independently rotatable wheels, a plurality of brake members one of which is associated with one of said wheels to rotate therewith and the other of which members is associated with the other of said wheels to rotate therewith, said members comprising brake engaging portions arranged adjacent one another in substantially the same cylindrical plane, brake means held against rotation and comprising a plurality of brake elements each of which is engageable with one only of said members, and means for causing engagement of said elements with their respective members.

28. In a device of the class described, in combination, a wheel unit comprising a pair of independently rotatable wheels, a pair of brake drums one of which is associated with one of said wheels to rotate therewith and the other of which drums is associated with the other of said wheels to rotate therewith, a supporting member held against rotation, a plurality of brake elements associated with said supporting member, each of which elements is engageable with one only of said drums, and means for causing simultaneous engagement of said elements with their respective drums.

29. In a device of the class described, in combination, a wheel unit comprising a pair of independently rotatable wheels, a pair of brake drums one of which is associated with one of said wheels to rotate therewith and the other of which drums is associated with the other of said wheels to rotate therewith, brake means held against rotation and comprising a supporting member, a plurality of brake elements associated therewith each of which elements is engageable with one only of said drums, a plurality of operating units one of which is operatively connected to a brake element engageable with one of said drums and another of which units is operatively connected to a brake element engageable with the other of said drums, and means interconnecting said units for simultaneous operation of said brake elements.

30. A dual wheel construction of the class described, comprising, in combination, a pair of independently rotatable wheels, a brake drum associated with one of said wheels to rotate therewith, and a brake drum associated with the other of said wheels to rotate therewith, said drums being positioned so that one revolves within the other, the outer drum having a braked portion arranged adjacent to and of substantially the same diameter as the inner drum.

31. A dual wheel, comprising a hub, a wheel carried by said hub, a brake drum carried by said hub, a second hub rotatably mounted on the first hub, a brake drum carried by said second hub, and a wheel secured to said second hub.

32. A dual wheel, comprising a hub, a wheel carried by said hub, a brake drum carried by said hub, a second hub rotatably mounted on the first hub, means releasably holding said second hub in place on its rotatable mounting, a wheel carried by said second hub, and a brake drum carried by said second hub.

33. A dual wheel, comprising a hub, a wheel carried by said hub, a brake drum carried by said hub, said hub having a bearing surface formed on a portion of its exterior, a second hub rotatably mounted on said bearing surface, said second hub having a brake drum, and a wheel carried by the second hub.

34. In combination, a tubular axle member having reduced ends, a brake plate secured to said axle member adjacent each end, independent braking means on opposite sides of each plate, a pair of wheels mounted on each end for independent relative rotation, and brake drums separately secured to each wheel and overlying opposite sides of said plate for independent engagement by said braking means.

35. In combination, a tubular axle member having reduced ends, a brake plate secured to said member adjacent each end, a pair of wheels at each end of said member mounted thereon for independent relative rotation, a brake drum on the inboard wheel overlying the inboard side of said plate, a brake drum on the outboard wheel overlying the outboard side of said plate, and separate brake drum engaging means mounted on opposite sides of said plate.

36. In combination, a tubular axle member having reduced ends, a brake plate secured to said member adjacent each end, a pair of wheels at each end of said member, one of said wheels being journalled on said end and having a hub extension forming a journal for the other wheel, a brake drum on the inboard wheel overlying the inboard side of said plate, a brake drum on the outboard wheel overlying the outboard side of said plate, and separate brake drum engaging means mounted on opposite sides of said plate.

37. In combination, an axle member having the ends thereof formed to provide wheel bearing seats, a first wheel rotatably mounted on one of said ends having an integral cylindrical hub extension, a second wheel on said end having its hub journalled on said extension, a brake drum carried by said first wheel on the inboard end of said extension, a spider secured to said second wheel and overlying said brake drum, and a second brake drum lying axially inwardly of said first drum and secured to said spider.

38. In combination, an axle member, a first wheel journalled on the end of said member, a second wheel disposed on the inboard side of said first wheel and rotatable relative thereto, laterally spaced brake drums on the inboard side of said second wheel, and means connecting each of said drums to one of said wheels.

39. In combination, an axle member, a pair of wheels mounted on the outboard end thereof for independent relative rotation, a pair of laterally spaced brake drums on the inboard side of the inboard wheel, and means connecting the drums to the respective wheels.

40. In combination, an axle member, a wheel journalled thereon and having an axially inwardly extending hub extension, a second wheel having its hub rotatably journalled on said extension, and a brake drum having a radially inwardly directed flange secured to the inner end of said hub extension.

41. The combination of claim 40 including an apertured spider secured to said second wheel extending axially inwardly over said brake drum and carrying a second brake drum at its inner end.

CHARLES S. ASH.